(12) United States Patent
Lam

(10) Patent No.: US 8,306,674 B2
(45) Date of Patent: Nov. 6, 2012

(54) SYSTEM AND METHOD FOR DIVERT AND ATTITUDE CONTROL IN FLIGHT VEHICLES

(75) Inventor: Frank C. Lam, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 594 days.

(21) Appl. No.: 12/572,138

(22) Filed: Oct. 1, 2009

(65) Prior Publication Data

US 2011/0082604 A1 Apr. 7, 2011

(51) Int. Cl.
*G01C 23/00* (2006.01)

(52) U.S. Cl. .......................................... 701/3

(58) Field of Classification Search ............... 701/2, 3, 701/4, 13
See application file for complete search history.

(56) References Cited

U.S. PATENT DOCUMENTS

| | | | |
|---|---|---|---|
| 5,335,179 A * | 8/1994 | Boka et al. ............. | 701/13 |
| 5,646,847 A | 7/1997 | Ratan et al. | |
| 6,208,915 B1 | 3/2001 | Schutte et al. | |
| 7,494,090 B2 | 2/2009 | Leal et al. | |
| 2008/0223977 A1 | 9/2008 | Dryer | |
| 2009/0001214 A1 | 1/2009 | Williams et al. | |
| 2009/0072076 A1 | 3/2009 | Brinkerhoff et al. | |

OTHER PUBLICATIONS

European Patent Office, International Searching Authority, "International Search Report" mailed Mar. 4, 2011; Intl. Appln. No. PCT/US2010/038706 filed Jun. 15, 2010.
Lizarralde, Fernando et al. "Attitude Control Without Angular Velocity Measurement: A Passivity Approach," 1995 IEEE Int. Conf. on Robotics and Automation (Osaka, Japan).
Wie, Bong et al. "Quaternion Feedback for Spacecraft Large Angle Maneuvers," vol. 8, No. 3, pp. 360-365, May-Jun. 1985.

\* cited by examiner

*Primary Examiner* — Kim T Nguyen
(74) *Attorney, Agent, or Firm* — Eric A. Gifford

(57) ABSTRACT

A system and method is provided for thruster control in a flight vehicle. The system and method uses a proportional derivative matrix control technique to determine thrust commands in a Divert and Attitude control (DAC) system. The proportional derivative matrix control system is configured to receive pitch, roll and yaw commands as inputs, and generate thrust commands as outputs. The performance of the proportional derivative matrix controller is such that the thrust commands can achieve the desired attitude angles quickly and with reduced fuel consumption. The matrix control system can efficiently control a variety of thrusters, including asymmetric thrusters having different moment arms. The matrix control system is particularly suitable to the control of DAC systems with asymmetric thrusters that are configured for attitude control.

20 Claims, 6 Drawing Sheets

| THRUSTER | POSITION (M) | | | THRUST VECTOR | | | DESCRIPTION |
|---|---|---|---|---|---|---|---|
| | X | Y | Z | X | Y | Z | |
| T1 | 0 | 0 | -MTA_Z | 0 | 0 | 1 | +Z DIVERT |
| T2 | 0 | MTA_Y | 0 | 0 | -1 | 0 | -Y DIVERT |
| T3 | 0 | 0 | MTA_Z | 0 | 0 | -1 | -Z DIVERT |
| T4 | 0 | -MTA_Y | 0 | 0 | 1 | 0 | +Y DIVERT |
| T5 | -x1 | -y1 | 0 | 0 | 0.7071 | -0.7071 | -PITCH, -YAW, +ROLL |
| T6 | -x2 | -y1 | 0 | 0 | 0.7071 | 0.7071 | +PITCH, -YAW, -ROLL |
| T7 | -x1 | y1 | 0 | 0 | -0.7071 | 0.7071 | +PITCH, +YAW, +ROLL |
| T8 | -x2 | y1 | 0 | 0 | -0.7071 | -0.7071 | -PITCH, +YAW, -ROLL |

300

SYSTEM AND METHOD FOR DIVERT AND ATTITUDE CONTROL IN FLIGHT VEHICLES

GOVERNMENT RIGHTS

This invention was made with United States Government support under Contract Number N00024-00-C-5390. The United States Government has certain rights in this invention.

TECHNICAL FIELD

The present invention relates to a system and method of control for flight vehicles, including missiles, kill vehicles, and space craft.

BACKGROUND

Divert and Attitude control (DAC) systems are used to maneuver flight vehicles such as missiles, kill vehicles (KV) or space craft. A typical DAC system includes thrusters that are used for divert maneuvers, attitude control, and stabilizing the flight vehicle. In some such systems, any burning of a thruster continuously creates pitch, yaw and roll moments. For effective operation the DAC system needs to be able to compensate for these recurring moments. If the control is not accurate and fast enough to compensate for these moments, the flight vehicle may overshoot or undershoot the desired path. Additionally, pointing errors can result in missed targets. Finally, a system with marginal stability may waste fuel.

Thus, what is needed are improved systems and methods of divert and attitude control for flight vehicles that improve the accuracy and efficiency of flight vehicle control. Other desirable features and characteristics of the present invention will become apparent from the subsequent Detailed Description and the appended Claims, taken in conjunction with the accompanying Drawings and this Background.

BRIEF SUMMARY

A system and method is provided for thruster control in a flight vehicle. The system and method uses a proportional derivative control technique to determine thrust commands in a Divert and Attitude control (DAC) system. The proportional derivative control system is configured to receive pitch, roll and yaw commands as inputs, and generate thrust commands as outputs. The performance of the proportional derivative controller is such that the thrust commands can achieve the desired attitude angles quickly and with reduced fuel consumption.

The control system can efficiently control a variety of thrusters, including asymmetric thrusters having different moment arms. The control system is particularly suitable to the control of DAC systems with asymmetric thrusters that are configured for attitude control. Such asymmetric thrusters can control attitude with a lower number of thrusters, but have previously required the use computationally complex control techniques due to the moments that are created with the firing of each thruster. The controller is able to control asymmetric thrusters to efficiently compensate for these moments while reducing overall fuel consumption.

In one embodiment, the control system receives line-of-sight rate commands and operates to reduce pointing error. Additionally, in one embodiment the control system receives center of gravity shift data and operates to cancel moments resulting from the center of gravity shift due to fuel burn and other causes.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

A system and method is provided for thruster control in a flight vehicle. The system and method uses a proportional derivative control technique to determine thrust commands in a Divert and Attitude control (DAC) system. In general, the proportional derivative technique uses feedback of the quaternion of the attitude error and angular velocity to globally stabilize the attitude of a ridged body. Additionally, angular velocity feedback is provided by a nonlinear filter of the quaternion, thus removing the need for direct angular velocity measurement. The proportional derivative control system is configured to receive pitch, roll and yaw commands as inputs, and generate thrust commands as outputs. The performance of the proportional derivative controller is such that the thrust commands can achieve the desired attitude angles quickly and with reduced fuel consumption. In one embodiment, the control system receives line-of-sight rate commands and operates to reduce pointing error. Additionally, in one embodiment the control system receives center of gravity shift data and operates to cancel moments resulting from the center of gravity shift due to fuel burn and other causes.

The control system can efficiently control a variety of thrusters, including asymmetric thrusters having different moment arms. The control system is particularly suitable to the control of DAC systems with asymmetric thrusters that are configured for attitude control. In general, a system has asymmetric thrusters if thrusters in the system have different moment arms. Such asymmetric thrusters can have significant advantages. In particular, the asymmetric arrangement of the thrusters allows a lower number of thrusters to be used for attitude control. For example, while a symmetric thruster arrangement would typically require six thrusters for complete attitude control, a set of asymmetric thrusters can provide attitude control with as few as four thrusters. This reduction in the required number of thrusters can significantly reduce the cost and complexity of flight vehicles.

However, while such asymmetric thrusters can control attitude with a lower number of thrusters, they have also previously required the use computationally complex control techniques due to the moments that are created with the firing of each thruster. In contrast, the proportional derivative controller is able to control asymmetric thrusters to efficiently compensate for these moments while reducing overall fuel consumption. Thus, the proportional derivative controller can facilitate the use of cost effective asymmetric thrusters in a wide variety of applications.

Figure 1:
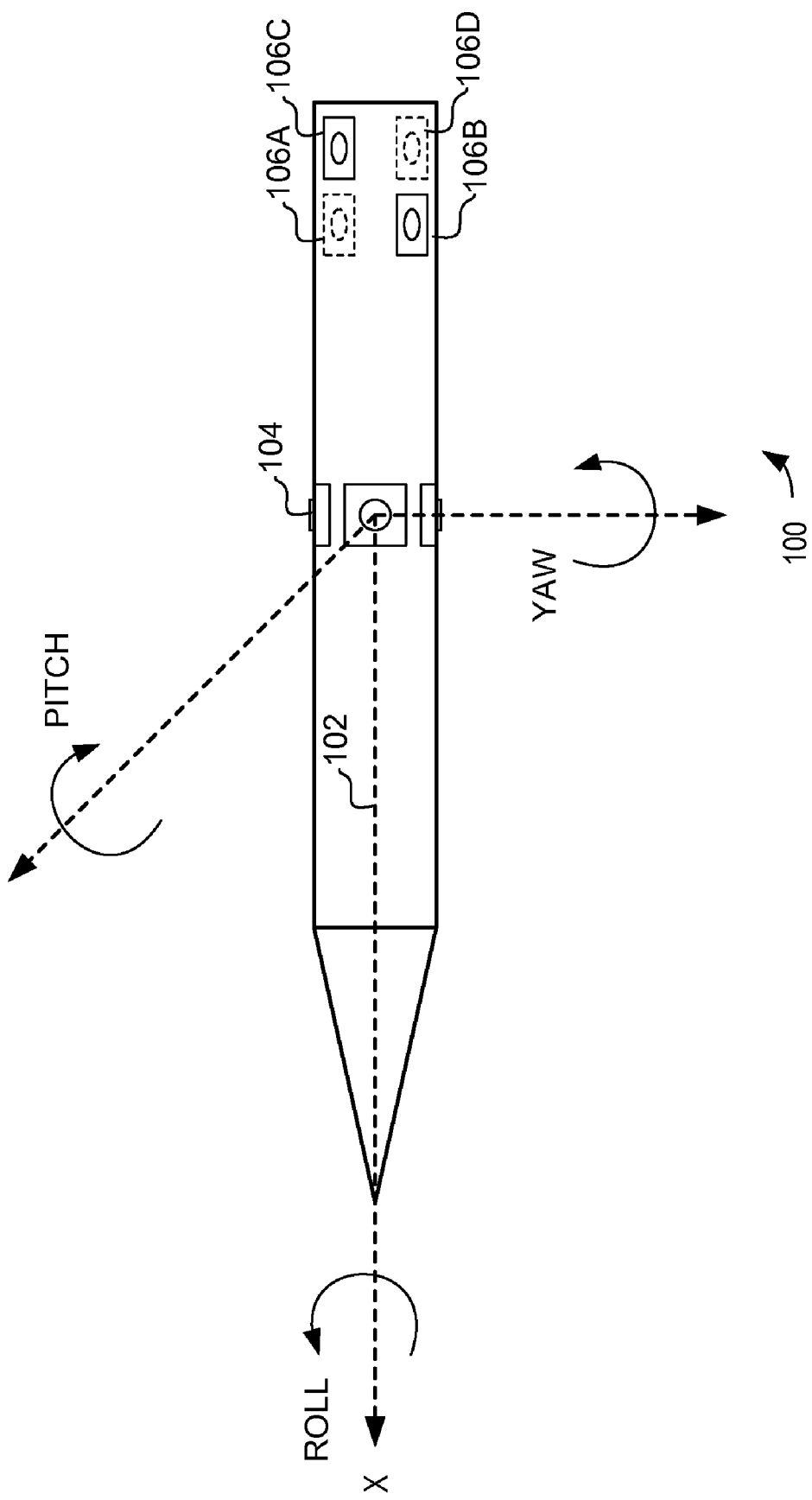
FIG. 1 is an isometric view of an exemplary flight vehicle in accordance with an embodiment of the invention.

Turning now to FIG. 1, an exemplary flight vehicle 100 is illustrated. The flight vehicle 100 is exemplary of the type of vehicles in which the controller can be utilized, which can include flight vehicles such as missiles, kill vehicles (KV) or space craft. In accordance with the various embodiments, the flight vehicle 100 uses a Divert and Attitude control (DAC) system during flight for both major control (i.e., divert maneuvers) and attitude control (i.e., pitch, yaw and roll control). As shown in FIG. 1, the flight vehicle is oriented with its body axis 102 along a roll axis (in FIG. 1 the X-axis), and The DAC system uses four major thrusters 104 for divert control, and four attitude control thrusters 106 for pitch (rotation about the Y-axis), yaw (rotation about the Z-axis) and roll control (rotation about the X-axis).

As will be explained in greater detail below, the attitude control thrusters 106 are asymmetric, allowing them to perform overlapping pitch, roll and yaw maneuvers. Specifically, because they are asymmetric, the firing of any of the four thrusters 106 will create pitch, roll and yaw moments in the vehicle 100. Because such a system only uses four attitude thrusters, such a system is relatively inexpensive when implemented with fixed impulse thrusters, and yet can provide high speed maneuverability. Thus, the use of simple asymmetric thrusters can provide a reliable and cost effective solution.

The thrusters 106 are mounted on the mounted on the flight vehicle 100 away from the vehicle's center of gravity. Furthermore, the thrusters 106 include a first pair (106A, 106B) that are closer to the center of gravity, and a second pair (106C, 106D) that are farther from the center of gravity. Additionally, these four thrusters are not aligned with Y-axis or Z-axis, and are instead located between Y-axis and Z-axis. This makes the performance of the thrusters asymmetric, meaning that any thrust of any thruster will create pitch, roll and yaw moments.

Figure 2:
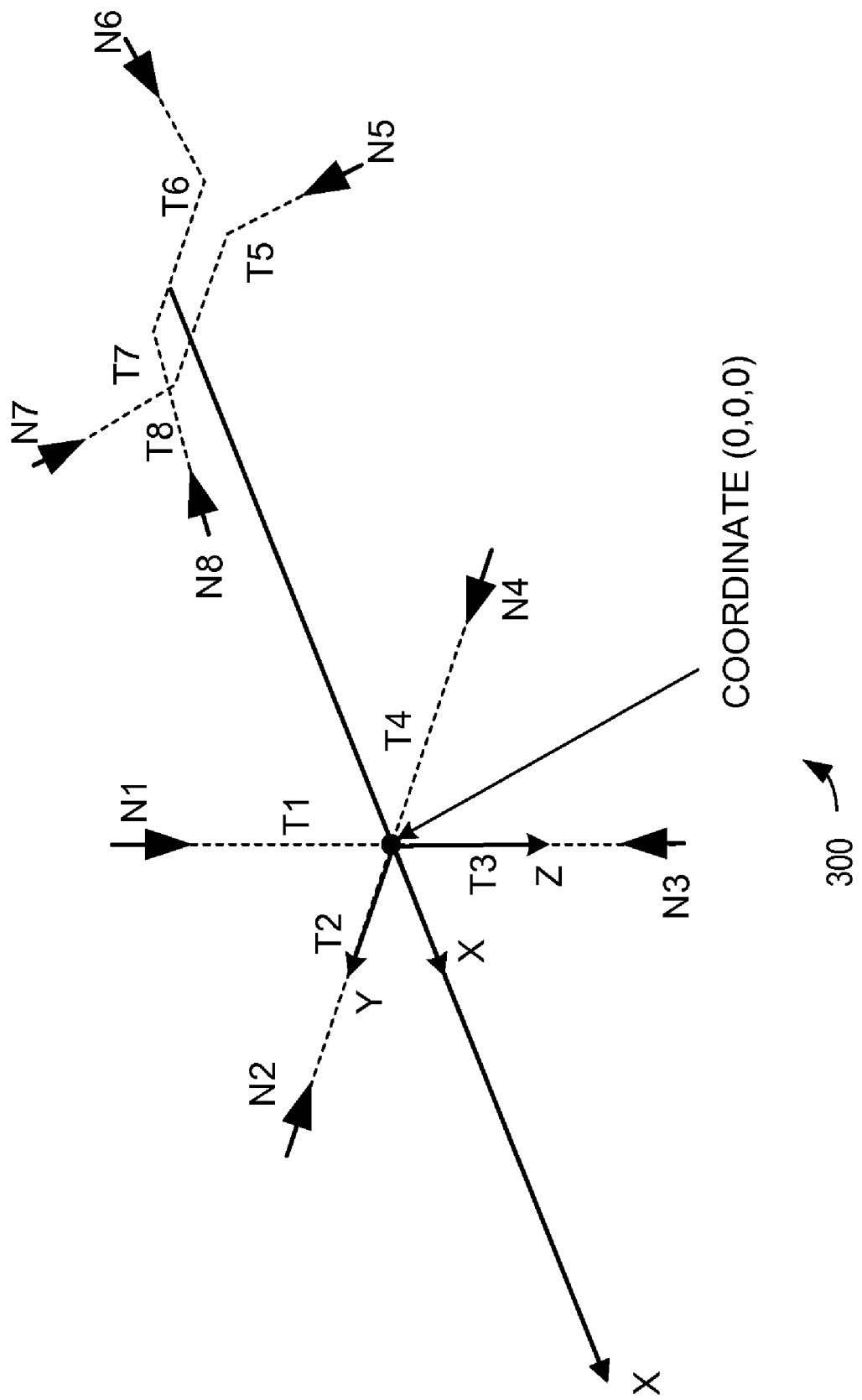
FIG. 2 is an exemplary thrust diagram in accordance with an embodiment of the invention.
Figure 3:
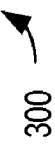
FIG. 3 is a table of thrust vectors in accordance with an embodiment of the invention.

Turning to FIGS. 2 and 3 a specific example of the DAC system with major and attitude thrusters is illustrated. In FIG. 2, the thrust vectors for exemplary sets of four major divert thrusters T1, T2, T3, and T4 (e.g., thrusters 104) and four attitude control thrusters T5, T6, T7, and T8 (e.g. thrusters 106) are illustrated in a body diagram and labeled with a coordinate system. The four major control thrusters T1, T2, T3, and T4 create four thrust vectors labeled N1, N2, N3, and N4 (with the corresponding arrows indicating the direction of the thrust vector). The four attitude control thrusters T5, T6, T7, and T8 create four thrust vectors labeled N5, N6, N7 and N8. As can be seen in this body diagram, the thrust vectors created by the four attitude control thrusters are asymmetric, meaning the firing of the thrusters will create different moment arms. The thrusters T5, T6, T7, and T8 are not aligned with Y-axis or Z-axis, and are instead located between Y-axis and Z-axis. Furthermore, the T5 and T7 are closer to the center of gravity than T6 and T8, and thus the firing of the thrusters will create different moments.

Turning to FIG. 3, a table 300 shows the exemplary thruster locations and directions relative to the center of gravity for thrusters T1-T8. In table 300, MTA_Z is the distance from (0,0,0) point along the Z-axis to thruster T1, and MTA_Y is the distance from (0,0,0) point along the Y-axis to thruster T2. Likewise, x1 is the distance from the (0,0,0) point to thrusters N5 and N7 along the X-axis and x2 is the distance from the (0,0,0) point to thrusters T6 and T8 along the X-axis. y1 is the location distance of the attitude thrusters T5, T6, T7 and T8 along the Y-axis perpendicular to the X-axis.

As can be seen in FIGS. 2 and 3, the performance of the thrusters is asymmetric, and any use of any thruster will create pitch, yaw and roll moments. Because of this, if the thruster control is not accurate and fast enough to compensate for the created moments, the vehicle will overshoot or undershoot. Such a system will have marginal stability, waste fuel and have a large pointing error.

It should be noted that the configuration of thrusters in FIGS. 1-3 is just one example of the type of configurations that can use asymmetric thrusters for attitude control. To improve reliability and keep costs low, each thruster is preferably very simple. For example, a configuration of fixed-impulse thrusters is highly effective and simplifies attitude control. In many applications, single-shot fixed-impulse thrusters provide a highly reliable and inexpensive solution to perform a single attitude control maneuver.

During vehicle flight a control system issues thrust commands calculated to generate specified attitude control maneuver. In a typical embodiment, these thrust commands are in the form of pulse width modulated signals that indicate the required time of thrust during each cycle to achieve the desired maneuvers. In an active closed-loop control system, the system constantly receive the pitch, yaw and roll angles, typically from an inertial navigation system, and use these values to determine the thrust times needed each cycle for each individual thruster. For example, to stop movement of the flight vehicle, the sum of the rotational moments in each of the pitch and yaw planes must be zero. Such maneuvers require that the pulse width modulation timing of firing be well controlled. For example, if the thrust times for each cycle are longer than the required, the missile will over pitch, over yaw and/or over rotate. Conversely, if the thrust times for each cycle are shorter than required the vehicle will under pitch, under yaw and/or under rotate.

Figure 4:
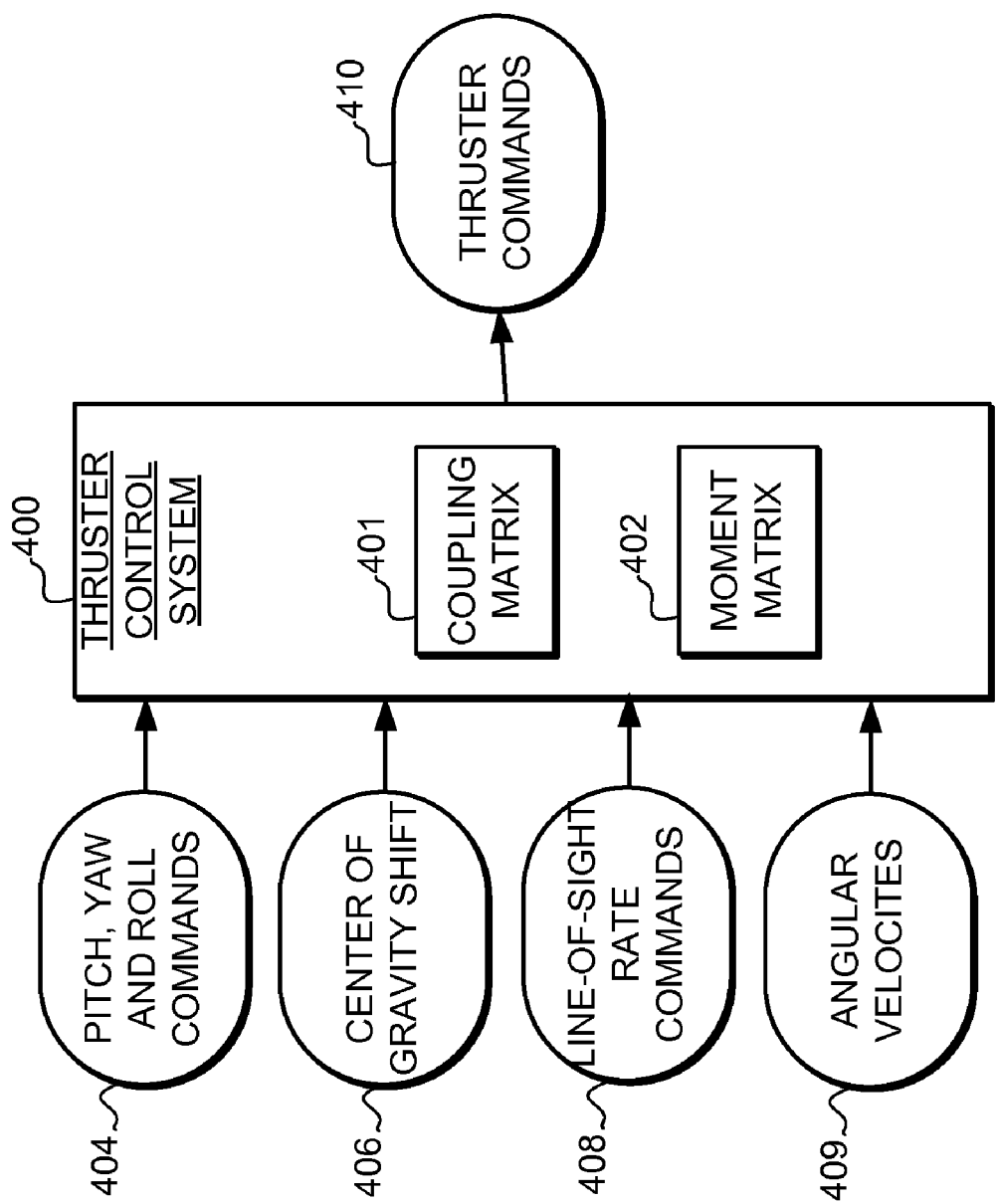
FIG. 4 is a schematic view of a thrust control system in accordance with an embodiment of the invention.

Turning now to FIG. 4, a first embodiment of a thruster control system 400 is illustrated. In a typical embodiment, the thruster control system 400 would be implemented by a processor. In this specification, the term "processor" is defined to include one or more processing elements that are adapted to perform the recited operations. Thus, a processor comprise all or part of one or more integrated circuits, firmware code, and/or software code that receive electrical signals from various sources and generate appropriate responses. In some embodiments, all processing elements that comprise the processor are located together. In other embodiments, the elements of a processor may spread across multiple devices in multiple locations.

The control system 400 uses a coupling matrix 401 and a moment matrix 402 to determine thrust commands for a Divert and Attitude control (DAC) system in a flight vehicle. Specifically, in this embodiment, the thruster control system 400 receives pitch, roll and yaw commands 404, center of gravity shift 406, line-of-sight rate commands 408, and angular velocities 409 as inputs. From these, the thruster control system 400 generates thruster commands 410 as outputs.

In a typical embodiment, the pitch, roll and yaw commands 404 are generated by a tracking system which compares the current pitch, roll and yaw to a desired pitch, yaw and roll to determine the commands. Likewise, in a typical embodiment the line-of-sight rate commands 408 and angular velocities 409 are generated by the guidance system and are typically in the form of radians per second. Finally, the center of gravity shift 406 is typically generated by estimating the CG shift distance resulting from fuel burn, and is in units of length.

The performance of the thruster controller system 400 is such that the thrust commands can achieve the desired attitude angles quickly and with reduced fuel consumption.

Additionally, the control system 400 operates to reduce pointing error of the flight vehicle and cancel moments resulting from the center of gravity shift due to fuel burn and other causes.

The thruster control system 400 can efficiently control a variety of thrusters, and is particularly suitable to the control of DAC systems with asymmetric thrusters that are configured for attitude control. As asymmetric thrusters can control attitude with a lower number of thrusters, the thruster control system 400 can provide a cost effective solution to attitude control in a flight vehicle. Specifically, the thruster control system 400 can control the asymmetric thrusters to efficiently compensate for created moments while reducing overall fuel consumption.

In general, the thruster control system 400 uses the coupling matrix 401 and the moment matrix 402 to determine the thrust commands for a DAC system in a flight vehicle. The derivation of example coupling matrixes and moment matrixes will now be discussed.

In general, the coupling matrix 401 is determined for a particular thruster arrangement by calculating the thruster moments in the X, Y and Z axes for a flight vehicle. Specifically, the coupling matrix 401 can be determined by calculating flight vehicles moment vectors as the cross product of position matrix and thruster force matrix for the particular thruster arrangement, and summing the thruster moments in the X, Y and Z axes.

For example a thrust moment matrix TM can be defined as:

$$[TM]=[P]\times[F] \qquad \text{Equation 1.}$$

Where P is the position matrix, and F is the force matrix. By summing the thruster moments in the X, Y and Z axes, the following relationship is obtained:

$$[M]=[B][T] \qquad \text{Equation 2.}$$

Where M is a vehicle moment matrix, T is a thrust command matrix, and B a coupling matrix. In equation 2, it can be seen that the coupling matrix B defines the relationship between the thrust provided by the thrusters and the moments generated on the flight vehicle. Given the relationship between the moment matrix M, the coupling matrix B and the thrust command matrix T, the operation of the thruster control system 400 can be expressed as:

$$T=[B]^{-1}M \qquad \text{Equation 3.}$$

When calculated, each element in the thrust matrix T corresponds to a generated thrust command for one of the thrusters in the DAC system.

In implementing the thruster control system 400, the moment matrix M is preferably configured to account for various moments that operate on the flight vehicle. For example, to account for position commands, rate feedback, line-of-sight rate commands, angular velocities and center of gravity shifts. By utilizing the moment matrix M and the coupling matrix B to solve for the thrust commands in the thrust command matrix T, the thruster control system 400 can provide efficient and accurate attitude control for a flight vehicle.

Several specific examples of a coupling matrix B and a moment matrix M will now be discussed. These examples correspond to the asymmetric thruster arrangement of thrusters 106 (T5, T6, T7, and T8) illustrated in FIGS. 1-3. But again, it is noted that this thruster arrangement is just one example of the type of thruster arrangements that the control system can be configured to control.

In such an embodiment with four thrusters being controlled, the position vectors P5-P8 can be defined as:

$$P5=[-x1,-y1,0]$$

$$P6=[-x2,-y1,0]$$

$$P7=[-x1,y1,0]$$

$$P8=[-x2,y1,0] \qquad \text{Equation 4.}$$

where x1, x2 and y1 are the distances to the thrusters as described above. The force vectors F5-F8 can likewise be defined as:

$$F5=[0, \cos(A5), -\sin(A5)]$$

$$F6=[0, \cos(A6), \sin(A6)]$$

$$F7=[0, -\cos(A7), \sin(A7)]$$

$$F8=[0, -\cos(A8), -\sin(A8)] \qquad \text{Equation 5.}$$

where A5-A8 are the thruster angles with respect to the Y-axis for thruster T5-T8 respectively. Defining $X_a=-x1-rcx$ and $X_b=-x2-rcx$, where rcx is the center of gravity shift distance forward along the x-axis from the divert plane.

Using equation 1, the thrust moment matrix TM is thus defined as:

$$\text{Equation 6}$$

$$TM = \begin{bmatrix} \sin(A5)*y*T5 & \sin(A5)*X_a*T5 & \cos(A5)*X_a*T5 \\ -\sin(A6)*y*T6 & -\sin(A6)*X_b*T6 & \cos(A6)*X_b*T6 \\ \sin(A7)*y*T7 & -\sin(A7)*X_a*T7 & -\cos(A7)*X_a*T7 \\ -\sin(A8)*y*T8 & \sin(A8)*X_b*T8 & -\cos(A8)*X_b*T8 \end{bmatrix}.$$

By summing the thruster moments in the X, Y and Z axes the vehicle moment matrix M is defined as:

$$\text{Equation 7}$$

$$\begin{bmatrix} Mx \\ My \\ Mz \end{bmatrix} = \begin{bmatrix} \sin(A5)*y & -\sin(A6)*y & \sin(A7)*y & -\sin(A8)*y \\ \sin(A5)*X_a & -\sin(A6)*X_b & -\sin(A7)*X_a & \sin(A8)*X_b \\ \cos(A5)*X_a & \cos(A6)*X_b & -\cos(A7)*X_a & -\cos(A8)*X_b \end{bmatrix} \begin{bmatrix} T5 \\ T6 \\ T7 \\ T8 \end{bmatrix}.$$

Equation 7 defines a specific implementation of the general relationship described in Equation 2 above. Thus, this equation describes a coupling matrix B that defines the relationship between the thrust provided by the thrusters and the moments generated on the flight vehicle.

For the Example illustrated in FIG. 2 and the thruster configurations given in table 300, the specific implementation of the coupling matrix B can thus defined as:

$$B = \begin{bmatrix} .707y & -.707y & .707y & -.707y \\ .707X_a & -.707X_b & -.707X_a & .707X_b \\ .707X_a & .707X_b & -.707X_a & -.707X_b \end{bmatrix}. \qquad \text{Equation 8}$$

Using the relationship described above in equation 3, the coupling matrix B and the vehicle moment matrix M can be used to determine the thrust commands. In such an implementation, the vehicle moment matrix M is configured to account for position commands, rate feedback terms, line-of-sight rate terms, and angular velocities. In such a system, the moment matrix $M_{ACS}$ can be defined as follows:

$$M_{ACS} = \begin{bmatrix} Kp_1 * \delta r + Kv_1 * (\dot{\sigma}_x - \omega_x) \\ Kp_2 * \delta p + Kv_2 * (\dot{\sigma}_y - \omega_y) \\ Kp_3 * \delta y + Kv_3 * (\dot{\sigma}_z - \omega_z) \end{bmatrix}.$$

Equation 9 where $Kp_1$, $Kp_2$ and $Kp_3$ are positive scalers for position gain in the X, Y and Z coordinates; $Kv_1$, $Kv_2$ and $Kv_3$ are positive scalars for velocity gain in the X, Y and Z coordinates; $\delta r$, $\delta p$, $\delta y$, are position commands for roll, pitch and yaw respectively; $\omega_x$, $\omega_y$, $\omega_z$ are angular velocity feedback terms; and $\dot{\sigma}_x$, $\dot{\sigma}_y$, $\dot{\sigma}_z$ are the line-of-sight rate terms. So defined, each element in the moment matrix $M_{ACS}$ defines a proportional derivative expression of the moments on the flight vehicle in terms of attitude error, the line-of-sight rate and the angular velocity.

In this embodiment, the gain scalars $Kp_1$, $Kp_2$, $Kp_3$, $Kv_1$, $Kv_2$, and $Kv_3$ would be calculated based on the physical dimensions of the flight vehicle. Such calculations may be done by trial and error to optimize system performance. The roll ($\delta r$), pitch ($\delta p$) and yaw ($\delta y$) commands would typically be provided by the vehicle system tracker, which receives attitude data from the inertial guidance system and target reference data, and generates the appropriate commands. These commands would typically be a delta angular position value for each command. Likewise, the feedback terms for each coordinate direction ($\omega_x$, $\omega_y$, $\omega_z$) would typically be of angular velocity and would generated by the inertial navigation system (INS).

Likewise, the line-of-sight rate terms ($\dot{\sigma}_x$, $\dot{\sigma}_y$, $\dot{\sigma}_z$) represent the rate of change of the line-of-sight rate commands used to track the desired target, and serve as feed forward terms that reduces pointing error in the system. These line-of-sight rate terms are added to reduce pointing error that could otherwise result from the pointing error being within the dead-band region where attitude control thrusters are not activated. Because of this, the use of the line-of-sight rate terms additionally reduces the chance that the attitude control thrusters will overcompensate when the pointing error exceeds the dead band region and result in an overshoot response. These values would typically be generated by the guidance system, and would typically be in the form of radians per second. As one example, the line-of-sight rate commands can be defined as:

$$\dot{\sigma} = \frac{\overline{R} x \overline{V}}{R^2}.$$

Equation 10 where $\overline{R} x \overline{V}$ are the relatively range and velocity to target vectors, and R is the magnitude of the vector $\overline{R}$.

In a variation on this embodiment, an additional feed forward term for shifts in vehicle center of gravity is added. In a typical flight vehicle, the center of gravity of the vehicle migrates as fuel is burned and weight decreases. When the center of gravity moves while main thrusters T1-T4 are firing, it creates additional angular motions by the main thrusters T1-T4. The additional center of gravity feed forward term is added to the moment matrix M to counter these moments. As one example, an $M_{DIVERT}$ matrix can be defined as:

$$M_{DIVERT} = \begin{bmatrix} -rcy & -rcz & rcy & rcz \\ rcx & 0 & -rcx & 0 \\ 0 & rcx & 0 & -rcx \end{bmatrix} \begin{bmatrix} T1 \\ T2 \\ T3 \\ T4 \end{bmatrix}.$$

Equation 11

Where rcx is again the distance the center of gravity has migrated along the vehicle X-axis from the divert plane, rcy is the distance the center of gravity has migrated along the vehicle Y-axis from the divert plane, and rcz is the distance the center of gravity has migrated along the vehicle Z-axis from the divert plane. The use of the $M_{DIVERT}$ matrix can be combined with the $M_{ACS}$ matrix to provide a single vehicle moment matrix that accounts for position commands, rate feedback terms, line-of-sight rate terms, angular velocities, and the center of gravity changes. Specifically, in this embodiment, the final thrust command can be generated as:

$$T = [B]^{-1} [M_{ACS} - M_{DIVERT}]$$

Equation 12.

In this embodiment, the matrix defined by $[M_{ACS} - M_{DIVERT}]$ is the moment matrix used to generate the thrust commands.

A variety of different techniques can be used to implement the thruster control system 400. First, it should be noted that the exemplary thruster command matrix T includes more elements than the product of the coupling matrix B and moment matrix M. In the example given above, the thruster command matrix includes 4 elements, while the moment and coupling matrix products define three elements. Thus, in this example equation 12 defines a problem with four unknowns and three equations. As is understood in mathematics, solving for four unknowns with three equations results in infinite solutions. To overcome this, the thruster control system is preferably implemented with appropriate constraints that are selected to provide manageable solutions that can be implemented in the thruster control system.

Figure 5:
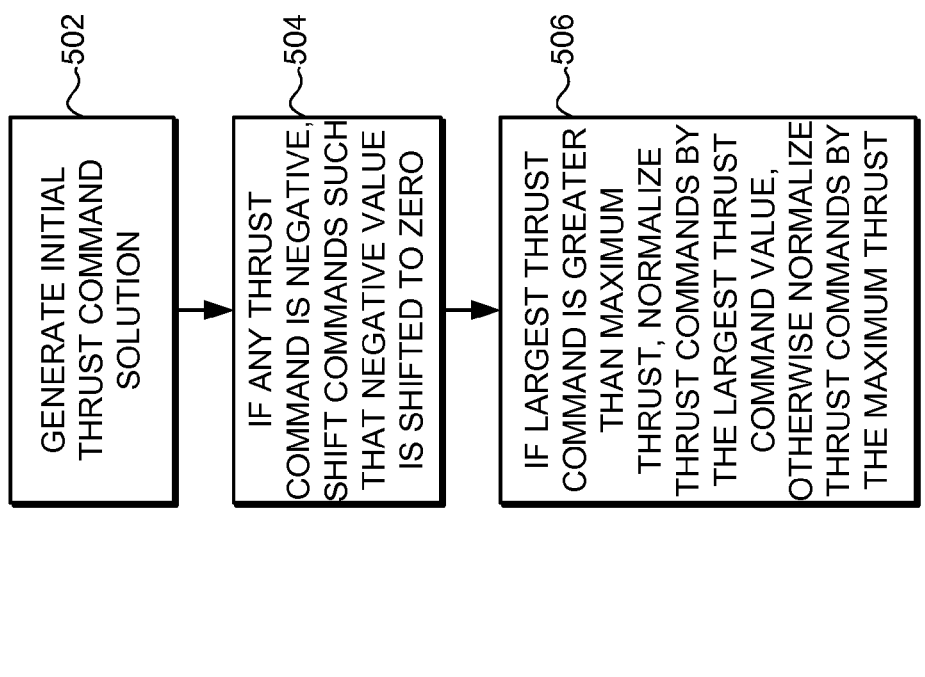
FIG. 5 is a flow diagram of a method for calculating thrust values in accordance with an embodiment of the invention is illustrated.

Turning now to FIG. 5, a method 500 for calculating thrust command values in an under-constrained matrix controller is illustrated. This method can be used to generate for the thrust command values as defined in the thrust command matrix. The first step 502 is to generate initial thrust value solutions. This is done by multiplying the matrices defined in equation 12 above. Specifically, multiplying the moment matrix $[M_{ACS} - M_{DIVERT}]$ by the pseudo inverse of the coupling matrix $[B]^{-1}$ generates a set of initial thrust command values. These thrust values will then used in steps 504 and 506 to generate the final optimized thrust values.

The next step 504 is to shift the array of thrust values if any thrust command values are negative. In this step at least one negative thrust command value is shifted to zero. This is done by adding a constant vector to all thrust values, where the vector results in the shifting of a negative value to zero. This step also constrains the values of the thruster command matrix T to positive quantities. As a typical thruster can only generate positive thrust, and is limited to the defined maximum thrust, this step helps constrain the generated thrust values that are actually available for use.

The shifting of the negative value to zero is allowed because the constant vector adds zero moment to the system. The addition of zero moment verifies that nothing in the system was changed and, through linearization, all values shift accordingly to meet the constraint that the values are positive or zero. It should also be noted that the thruster command values after shifting are still valid solutions to the initial equations. Furthermore, because at least one thrust value is set to zero, at least one thruster, and perhaps more, will not be fired this cycle. This reduction in thruster use consumes less fuel and is more efficient than using all four thrusters.

Then, in step 506, if the largest thrust command is greater than the maximum thrust, the thrust commands are normalized by the largest thrust command values. Otherwise, the thrust commands are normalized the maximum thrust.

In a typical system, the thrusters can only provide a maximum thrust level, but the design requires different amounts of impulses. To create different amounts of impulse, the thrusters burn for a certain time and rapidly open and close thruster valves per duty cycle. This is typically referred to as a pulse width modulation technique. To determine the time each thruster should burn each cycle, the thruster values are normalized to a proportion of the duty cycle for each command. The proportion is the amount of the duty cycle the thruster burns to obtain the desired impulse.

Thus, in the first part of step 506, if one of the thrust command values exceeds the maximum thrust that can be generated by the thrusters, then the normalization results in that thrust command being scaled down to the maximum available thrust, and the other values scaled proportionally. Thus, the largest thrust command would be scaled to a value of 1, which indicates the application of full thrust over the full duty cycle.

Otherwise, in the second part of step 506, the thrust commands are normalized by the maximum thrust. In this case, the largest command will not equal the maximum thrust command, but will be some proportion less than the maximum thrust value.

Step 506 results in normalizing that provides optimal performance with fast response command calculation and increased efficiency. Thus, using the method 500 and repeatedly sending commands in each duty cycle and timed thruster burns to obtain the impulse required, the control system provides stable performance, uses less fuel, and provides greater efficiency to its tracking system.

As one example of this process, assume the multiplication the moment and inverse coupling matrices generates initial thrust values for thrusters T5-T8 of [10, 5, 0, −5]. Because the thrust value for T8 is negative, step 504 shifts the values of the thruster such that at least one value is shifted to zero and all other values are non-negative. In this example, the thrust values can be shifted to by adding the appropriate constant vector to the thrust command matrix. Using the example above, the thrust values [10, 5, 0, −5] can be shifted to [15, 10, 5, 0]. Again, this adding of a constant vector adds zero moment to the system, and the resulting shifted values are thus still an appropriate solution.

In the next step 506, if the largest thrust command is greater than the maximum thrust, the thrust commands are normalized by the largest thrust command values. Otherwise, the thrust commands are normalized the maximum thrust.

In the current example, if the largest available thrust is 8, then the shifted values of [15, 10, 5, 0] will be normalized by the largest thrust command (in this case 15) and will thus be normalized to [1, 0.67, 0.33, 0]. With these optimized thrust values used the control the thrusters, the thruster T5 will be burn for the full duty cycle, T6 will burn for approximately 67 percent of the duty cycle, T7 will burn for 33 percent of the duty cycle, and T8 will not burn.

In an alternate example, if the largest available thrust is 8, and the shifted values are [6, 5, 0, 4], these values will be normalized by the maximum thrust according to the second part of step 506. This will result in normalized thrust values of [0.75, 0.625, 0, 0.5] When these optimized thrust values are used to control the thrusters, T5 would burn for 75 percent of duty cycle, T6 would burn for approximately 63 percent of duty cycle, T7 will not burn, and T8 will burn for 50 percent of duty cycle.

Again, such scaling and normalizing provides optimal performance and results in fast response command calculation, stable performance, less fuel use, and provides greater efficiency to its tracking system.

In a typical system the generated thrust command is passed to a pulse width modulator (PWM), which computes the modulation command. To minimize fuel consumption and electrical current, the PWM generates a signal such that the value is open for more than one sampling time if the thrust command is equal to or greater than the sampling time. Otherwise, the valve will operate at its specified cycle rate (e.g., 180 Hz)

Figure 6:
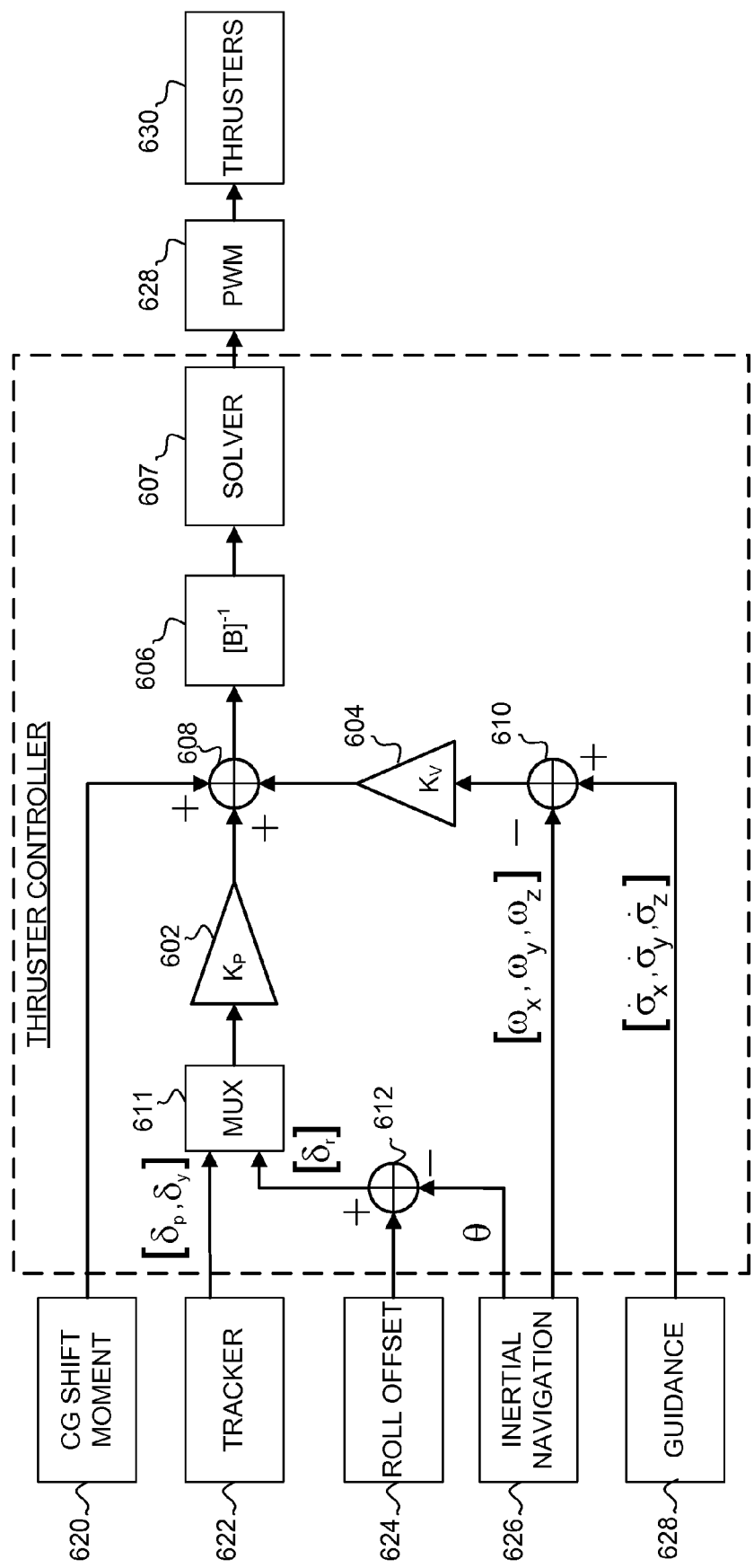
FIG. 6 is a schematic view of a thrust control system in accordance with an embodiment of the invention.

Turning now to FIG. 6, a specific example of a thrust controller 600 will now be illustrated schematically. The thrust controller receives data from center-of gravity (CG) shift moment system 620, tracker system 622, roll offset 624, inertial navigation system 626 and guidance system 628. The controller 600 itself includes amplifiers 602 and 604, summers 608, 610 and 612, multiplexer 611, coupling matrix 606, and solver 607. In general, the controller 600 implements the matrix control techniques described above, and output optimized thrust commands to a pulse width modulation system 628, which controls the firing of thrusters 630.

The CG shift moment system tracks changes in the flight vehicle's center of gravity due to fuel burn. This data is typically in the form of a length measurement corresponding to the current center of gravity, which can be used to compensate for changes in the center of gravity.

The tracker system 622 compares the measured pitch and yaw values to a desired pitch and yaw, and generates delta values ($\delta p$, $\delta y$) that represent the difference. These delta values for pitch and yaw ($\delta p$, $\delta y$) are passed to the multiplexer 611.

The roll offset 624 provides a default roll command. For example, in some cases a constant −45 degree roll is desirable, and the roll offset 624 can provide such an offset to summer 612. The inertial navigation system 626 provides a body roll angle ($\theta$), which is added to the roll offset in summer 612 to provide a delta roll value ($\delta r$). The delta roll value ($\delta r$) is passed to the multiplexer 611, where it is combined with the delta pitch ($\delta p$) and delta yaw ($\delta y$) values. The result in then passed to the amplifier 602.

The inertial navigation system 626 also provides feedback terms in the form of angular velocities ($\omega_x$, $\omega_y$, $\omega_z$) to the summer 610. The guidance system 628 provides line-of-sight rate terms ($\dot{\sigma}_x$, $\dot{\sigma}_y$, $\dot{\sigma}_z$) in the form of radians per second to the summer 610. These values are combined by the summer 610 and passed to the amplifier 604.

The amplifiers 602 and 604 amplify the incoming signals by the position gain vector Kp and the velocity gain vector Kv respectively. As was described above, the position gain vector Kp includes three scalar elements $Kp_1$, $Kp_2$, and $Kp_3$, and the velocity gain vector Kv includes three scalar elements $Kv_1$, $Kv_2$, and $Kv_3$. The results are then added together with the CG shift moment by summer.

This amplification and multiplication performs operations that effectively generate a moment matrix [$M_{ACS}$–$M_{DIVERT}$], as was described above. These results are then multiplied by the inversed coupling matrix $[B]^{-1}$. The result of the matrix multiplication is to generate an array of initial thrust command values [T] one for each of the attitude control thruster.

The initial thrust command values are passed to the solver 607. The solver uses the techniques described above with reference to FIG. 5 to generate optimized thrust commands.

This includes shifting the thrust values to eliminate negative values and normalizing by largest thrust command or maximum thrust as appropriate. This results in optimized thrust commands that are passed to the Pulse Width Modulator 628 to generate the final pulse width modulated control signals for the thrusters 630.

The result of the operation of the thrust controller 600 is thrust commands that can achieve the desired attitude angles quickly, cancel moments resulting from center of gravity shifts, with reduced fuel consumption and reduces pointing error. Such a system is particularly suitable to the control of DAC systems with asymmetric thrusters that are configured for attitude control.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A thruster control system for a flight vehicle comprising:
   only four thrusters that provide pitch, yaw and roll control; and
   a processor configured to receive pitch, yaw and roll commands, and responsive to the pitch, yaw and roll commands generate a plurality of thruster commands in a thrust command matrix T for the four thrusters using a matrix control technique, said processor calculating $T=[B]^{-1} M$ where M is a vehicle moment matrix, B is a coupling matrix that defines a relationship between a thrust provided by the thrusters and a plurality of moments generated on the flight vehicle, and $[B]^{-1}$ is a pseudo inverse of the coupling matrix B.

2. The thruster control system of claim 1 further comprising:
   a plurality of divert thrusters to provide divert control,
   wherein the processor is further configured to receive data indicating center-of-gravity shift moments in the flight vehicle while the divert thrusters are firing, and
   wherein the processor is further configured to compensate for the center-of-gravity shift moments with the plurality of thruster commands by subtracting a divert moment matrix from the moment matrix M.

3. The thruster control system of claim 1 wherein the processor is further configured to receive line-of-sight rate commands for the flight vehicle, and wherein the processor is further configured to generate the plurality of thruster commands responsive to the line-of-sight rate commands using the matrix control technique.

4. The thruster control system of claim 1 wherein the four thrusters comprise at least one asymmetric thruster.

5. The thruster control system of claim 1 wherein the four thrusters are part of a liquid divert and attitude control system on the flight vehicle.

6. The thruster control system of claim 1 wherein the processor is configured to generate the plurality of thruster commands for the four thrusters by generating an array of thruster values for thrust command matrix T and, if any thrust command values are negative, adding a constant vector to all of the thruster values such that all of the thruster values are positive values or zero.

7. The thruster control system of claim 1 wherein the processor is configured to generate the plurality of thruster commands for the four thrusters by generating an array of thruster values and adding a constant vector to all thruster values such that at least one thruster value is shifted to zero.

8. The thruster control system of claim 7 wherein the processor is configured to generate the plurality of thruster commands for the four thrusters by further normalizing the array of thruster values by a largest thruster value in the array of thruster values if the largest thruster value exceeds a maximum value.

9. The thruster control system of claim 8 wherein the processor is configured to generate the plurality of thruster commands for the four thrusters by further normalizing the array of thruster values by the maximum value if the largest thruster value does not exceed the maximum value.

10. The thruster control system of claim 1 wherein firing any one of the thrusters creates pitch, yaw and roll moments in the flight vehicle.

11. A thruster controller system for a flight vehicle comprising a plurality of thrusters, wherein at least one of the plurality of thrusters is asymmetric to another thruster in the plurality of thrusters, the thruster controller system comprising:
   a processor configured to receive:
      pitch, yaw and roll commands for the flight vehicle;
      data indicating center-of-gravity shift moments in the flight vehicle; and
      line-of-sight rate commands for the flight vehicle;
   wherein the processor is further configured to generate a plurality of thruster rate commands responsive to the pitch, yaw and roll commands and the line-of-sight commands, and configured to compensate for the center-of-gravity shift moments, using a proportional derivative matrix technique, and wherein the processor is configured to generate the plurality of thruster commands for the plurality of thrusters by generating an array of thruster values and shifting the array of thruster values such that all the thruster values are positive and at least one thruster value in the array of thruster values is shifted to zero, normalizing the array of thruster values by a largest thruster value in the array of thruster values if the largest thruster value exceeds a maximum value, and normalizing the array of thruster values by the maximum value if the largest thruster value does not exceed the maximum value.

12. A method for thruster control in a flight vehicle comprising the steps of:
   providing the flight vehicle with only four thrusters that provide pitch, yaw and roll control;
   receiving pitch, yaw and roll commands; and
   generating a plurality of thruster commands in a thrust control matrix T for the four thrusters in response to the pitch, yaw and roll commands and using a matrix control technique, said technique calculating $T=[B]^{-1} M$ where M is a vehicle moment matrix, B is a coupling matrix that defines a relationship between a thrust provided by the thrusters and a plurality of moments generated on the flight vehicle, and $[B]^{-1}$ is a pseudo inverse of the coupling matrix B.

13. The method of claim 12 further comprising the steps of:
   providing the flight vehicle with a plurality of divert thrusters to provide divert control;

receiving data indicating center-of-gravity shift moments in the flight vehicle while the divert thrusters are firing; and wherein the step of generating the plurality of thruster commands comprises compensating for the center-of-gravity shift moments with the plurality of thruster commands by subtracting a divert moment matrix from the moment matrix M.

14. The method of claim 12 further comprising the steps of receiving line-of-sight rate commands for the flight vehicle; and wherein the step of generating the plurality of thruster commands comprises generating the plurality of thruster commands responsive to the line-of-sight rate commands using the proportional derivative matrix technique.

15. The method of claim 12 wherein the four thrusters comprise at least one asymmetric thruster.

16. The method of claim 12 wherein the four thrusters are part of a liquid divert and attitude control system on the flight vehicle.

17. The method of claim 12 wherein the step of generating a plurality of thruster commands for the four thrusters comprises:

generating an array of thruster values; and
adding a constant vector to all thruster values such that all the thruster values are positive values or zero.

18. The method of claim 12 wherein the step of generating a plurality of thruster commands for the four thrusters comprises:

generating an array of thruster values; and
adding a constant vector to all thruster values such that at least one thruster value in the array of thruster values is shifted to zero.

19. The method of claim 18 wherein the step of generating a plurality of thruster commands for the four thrusters further comprises:

normalizing the thruster values by a largest thruster value in the array of thruster values if the largest thruster value exceeds a maximum value.

20. The method of claim 18 wherein the step of generating a plurality of thruster commands for the four thrusters further comprises:

normalizing the array of thruster values by the maximum value if the largest thruster value does not exceed the maximum value.

* * * * *